Aug. 4, 1970   T. J. CAPPELLO   3,522,505
SOLID STATE STARTER AND CONTROLLER FOR ELECTRIC MOTOR
Filed April 9, 1969
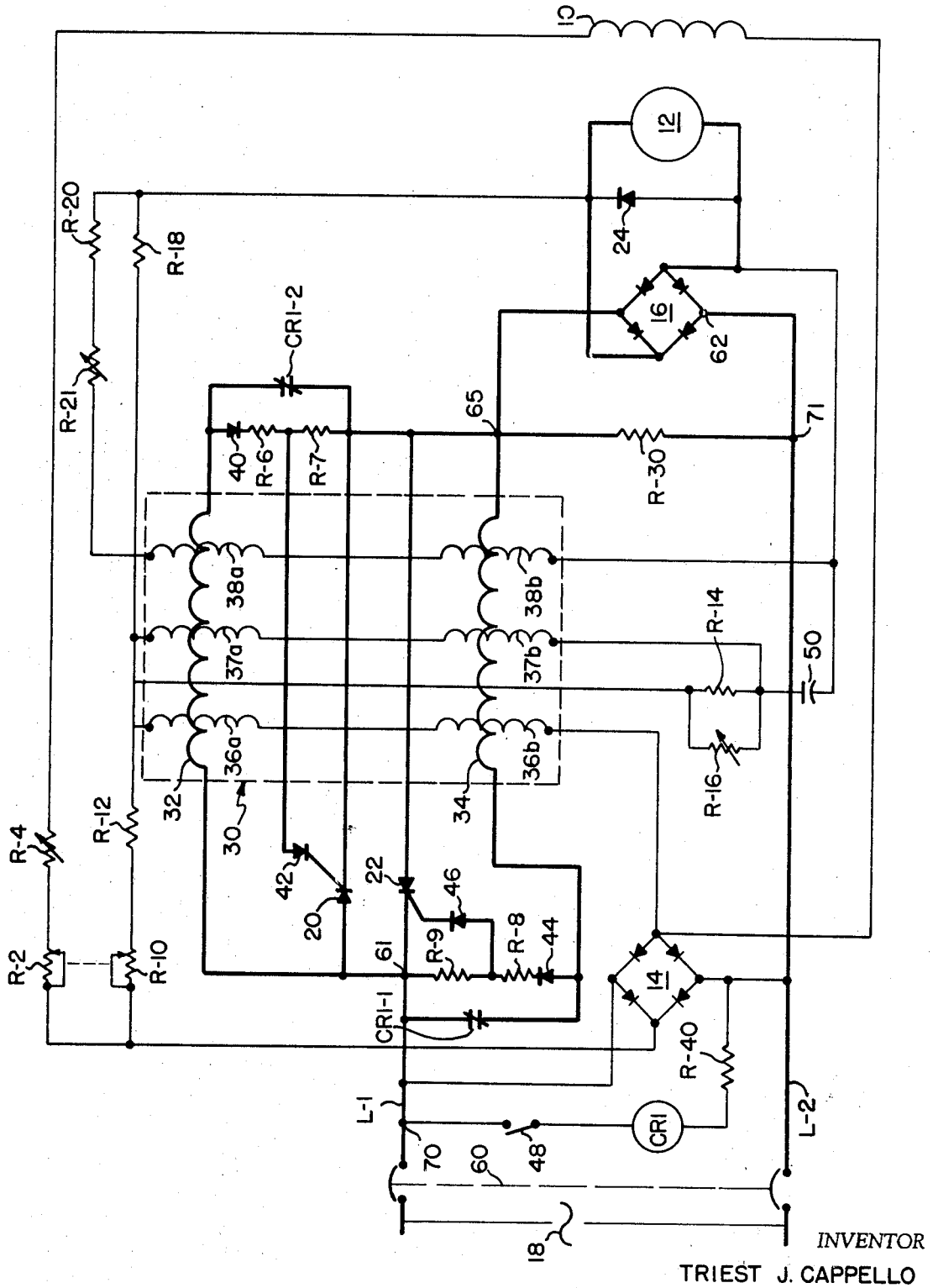
INVENTOR
TRIEST J. CAPPELLO
BY
ATTORNEY

United States Patent Office 3,522,505
Patented Aug. 4, 1970

3,522,505
SOLID STATE STARTER AND CONTROLLER FOR ELECTRIC MOTOR
Triest J. Cappello, Depew, N.Y., assignor to CF Electronics Incorporated, Depew, N.Y., a corporation of New York
Filed Apr. 9, 1969, Ser. No. 814,730
Int. Cl. H02p 5/18
U.S. Cl. 318—431                          6 Claims

ABSTRACT OF THE DISCLOSURE

To control current surges in the armature of a D.C. motor during starting, two silicon controlled rectifiers and the gate windings of a magnetic amplifier are connected in parallel with one another and in series with the input terminals of a full wave rectifier across an alternating current source, and the armature is connected across the output of the full wave rectifier. Two normally-closed, relay-operated switches normally shunt out the triggering diodes of the SCR devices, and connect the gate windings as high impedance with the rectifier input terminals to stop the armature. When the switches are open, the SCR devices are triggered and gradually increase the current flow to the input terminals to start the armature.

---

This invention relates to electric motors, and more particularly to a solid state device, which can be used with an alternating current power source for starting and controlling the speed of a direct current motor.

Because there is no back voltage or counter-EMF generated in the armature winding of a direct current motor at standstill, the armature current is limited only by the very small resistance of the armature circuit, when full line voltage is applied to the motor to start it. Therefore, a protective resistance must be included in the armature circuit, when the motor is initially started, to limit the armature current to a reasonable value. As a result it has been customary to start D.C. (direct current) motors with a starting box, a controller, or some similar device, which temporarily inserts additional resistance in the armature circuit at start. These starting units are expensive and space consuming.

An alternative method of starting a D.C. motor is to apply to its armature circuit a relatively low-voltage source, and then gradually increase the voltage as the motor speed increases. When the motor reaches a predetermined speed, its armature will have developed enough counter-EMF to limit the flow of armature current to a reasonable value. This latter method of starting D.C. motors also requires the use of relatively expensive equipment.

In my U.S. Pat. No. 3,230,437 there is disclosed a solid state circuit for controlling the energization rate and speed of a D.C. motor to provide smooth, anti-hunt characteristics during acceleration and steady drive of the motor.

It is an object of this invention to provide novel means for starting a direct current motor, which will obviate the use of heavy current carrying starters or contacts.

Another object of this invention is to provide a device which enables a D.C. motor to be started smoothly without closing the main power carrying conductors.

Another object of the invention is to provide a device which will permit bringing a motor to a full stop without opening the main power carrying conductors.

Another object of the invention is to provide a motor starter and speed control circuit that will enable a motor to be turned on and off hundreds of times a minute without adversely affecting the operation of the circuit or of the motor.

Another object of the invention is to provide a device which will enable a motor to be started by the use of a small switch carrying milliamperes of current; by the use of thermistors; by the use of light-sensitive switches; by the use of small relay contacts, and the like.

A more specific object of this invention is to provide an improved solid state D.C. motor controller having a novel switching circuit for turning a motor on and off, and which carries a relatively small current measurable in milliamperes.

Other objects of the invention will be apparent hereinafter from the specification and from the recital of the appended claims, particularly when read in conjunction with the accompanying drawing.

The circuit diagram in the drawing is illustrative of a solid state D.C. motor control device made in accordance with one embodiment of this invention. The motor has a shunt field winding 10 and an armature 12. The field 10 is connected in series with two variable resistors R–2 and R–4 across the output terminals of a full wave rectifier 14, which is connected across the main power leads L–1 and L–2. The armature 12 is connected across the output terminals of a full wave rectifier 16, the input terminals of which are connected across the main input leads L–1 and L–2 and thereby connected to any convenient source 18 of single phase alternating current. A pair of silicon controlled rectifiers 20 and 22 are provided in the circuit and oriented in opposite directions, respectively, for conducting on alternate cycles of the source 18. A diode 24 is connected directly across the armature 12 biased in its back direction for protective purposes.

A saturable reactor 30 having two main or gate windings 32 and 34, and three split control windings 36a and 36b, 37a and 37b, and 38a and 38b, is connected for controlling the firing times of the silicon controlled rectifiers 20 and 22 on each cycle of the source 18, thereby to regulate the energization rate of the armature 12.

The first main winding 32 of the reactor is connected between the anode and the cathode of the silicon controlled rectifier 20 in series with an auxiliary diode rectifier 40 and two resistors R–6 and R–7. The trigger terminal of the SCR 20 is connected through a diode 42 to the common terminal between the two resistors R–6 and R–7.

Similarly, the second main winding 34 of the reactor is connected between the cathode and anode of the SCR 22 in series with a diode 44 and two resistors R–8 and R–9. The trigger terminal of rectifier 22 is connected through an auxiliary diode 46 to the common terminal between the two resistors R–8 and R–9.

The first control windings 36a and 36b may be called the variable control windings, and are connected across the output of the full wave rectifier 14 in series with a variable speed control resistor R–10 and a fixed limiting resistor R–12.

The second control windings 37a and 37b are connected in parallel with a fixed resistor R–14 and a variable resistor R–16 for limiting the induced currents flowing in the windings. The second control windings 37a and 37b are also connected through a capacitor 50 and a limiting resistor R–18 across the armature 12 so that they are sensitive to the ripple voltage appearing across the armature as well as to the induced voltage resulting from currents in the other windings of the reactor.

The third control windings 38a and 38b are the feedback windings and are connected across the armature 12 in series with a relatively low value fixed resistor R–20 and a variable resistor R–21.

The provision of the variable resistor R–2 in series with the field 10 of the motor is optional. It provides control of the energization rate of the field 10 synchronously with the control of current through the first control windings 36a and 36b. Satisfactory control may be achieved in most instances without providing this variable resistor R–2.

As thus far described, the device is generally similar to that disclosed in my Pat. No. 3,230,437. However, in the present circuit there is connected across the lines L–1, L–2, or the input to rectifier 14, and in series with a resistance R–40 and normally-open manually-operated switch 48, is a control relay CR1. This relay controls normally-closed switches CR1–1 and CR1–2. Switch CR1–1 is connected in parallel with the diode 44 and the resistors R8 and R9 in series therewith. The normally-closed switch CR1–2 is connected in parallel with the diode 40 and the resistors R–6 and R–7 in series therewith.

Connected in parallel with the input to rectifier 16, or from line L–2 to terminal 65, is a resistor R–30. The speed of the armature 12 is determined by the shape of the signal pulses through the gate windings 32 and 34; and the shape and duration of these pulses are in turn controlled by the amount of current that flows through the control windings 36a, 36b, 37a, 37b, 38a and 38b during the rotation of armature 12.

The operation of the circuit will be understood from the preceding description, but may be briefly summed up here:

In operation, when the circuit breaker 60 is closed, power is applied to points 70 and 71. Assuming that at this time switch 48 is open, relay CR1 will be deenergized, and switches CR1–1 and CR1–2 will be closed, so that an alternating current in the order of several milliamperes flows through the gate windings 32 and 34, and through the resistor R–30. At this time a portion of this small current flows in the rectifier 16 and the armature 12, but it is not enough to start the armature rotating. The D.C. motor is thus in its "off" or non-operating state, even though power is being applied through lines L1, L2. The reason for this is that the rectifiers 20 and 22 are in their essentially non-conducting states; and the gate windings 32 and 34 appear as high impedances in series with armature 12, so that the motor remains motionless.

When, however, the relay-responsive switches CR1–1 and CR1–2 are opened in response to closing of switch 48 and the consequent energization of the coil of relay CR1, current flows through diode 40, resistor R–6 and diode 42 to the gate of the SCR 20, and through diode 44, resistor R–8 and diode 46 to the gate of the SCR 22, so that both silicon controlled rectifiers 20 and 22 are triggered and begin to conduct. The motor 10 starts to run. Its acceleration and operating speed are controlled by the saturable reactor 30 in a known manner through the shape of the pulses through reactor windings 32 and 34. The shape and duration of the pulses are controlled by the amount of current that flows through control windings 36a–36b, 37a–37b, 38a–38b.

When it is desired to stop the rotation of armature 12, the switch 48 is opened to deenergize relay CR1, reclosing switches CR1–1 and CR1–2, thus shunting out the triggering circuits for rectifiers 20 and 22 so that no triggering signals are applied to the gates of these rectifiers; and as a consequence they return to their current-blocking states.

The resistor R–30 acts as a load to the A.C. portion of the circuit; and it allows the rectifiers 20 and 22 to be controlled over a wide range, when they are in their conducting states.

From the foregoing, it will be apparent that applicant has devised a relatively simple and inexpensive electrical circuit for turning on and off a D.C. motor without causing the motor armature circuit to be subjected to undesirable surges of current, and without interrupting the main carrying conductors (L–1 and L–2) that supply power to the motor. With applicant's device small switches (CR1–1 and CR1–2), which carry only a few milliamperes of current, enable a motor to be turned on and off hundreds of times a minute without adversely affecting the operation of the control circuit or its associated motor.

Although switch 48 and relay CR1 have been illustrated as being connected across the leads L–1 and L–2, it will be apparent that they may be connected across a different voltage supply so that switches CR1–1 and CR2–2 could be controlled from a separate power source. Also although switch 48 is shown as a manually-operable switch, it will be apparent to one skilled in the art that, if desired, the switch could be of the type which is automatically responsive to a condition such as a temperature, light intensity, etc.

Having thus described my invention, what I claim is:

1. A control circuit for energizing a direct current load such as a D.C. motor, comprising:
   a full wave rectifier,
   a pair of triggerable rectifier devices,
   a saturable reactor having two separate main windings, and control windings for developing triggering signals in said main windings for said devices,
   means connecting said devices and said main windings in parallel with one another and in series with the input terminals of said full wave rectifier across a source of alternating current,
   means for connecting a D.C. motor across the output of said full wave rectifier for operation thereby, when said devices are in their conducting states,
   means for applying triggering signals from said main windings to said devices to switch said devices from substantially non-conducting states to their conducting states, and
   switch means interposed between said main windings and said full wave rectifier, and operable to remove said triggering signals from said devices without deenergizing said main windings.

2. A control circuit as defined in claim 1 wherein
   said signal applying means comprises a pair of circuits, each of which connects one of said main windings to one of said devices, and
   said switch means comprises a pair of switches, each of which is connected in parallel with one of said pair of circuits, and in series with the corresponding main winding and the input terminals to said full wave rectifier,
   said switches being operative, when closed, to shunt said pair of circuits to remove said triggering signals from said devices, and being operative, when open, to cause the signals from said main windings to be applied through said pair of circuits to said devices.

3. A device as defined in claim 2, wherein
   said switches are normally closed relay switches, and
   a relay is operable selectively to open and close said switches thereby to start and stop, respectively, the operation of said motor.

4. A device as defined in claim 2, including a load connected in series with said main windings, and in parallel with the inlet terminals to said full wave rectifier.

5. A control circuit for energizing a direct current load such as a D.C. motor, comprising:
   a full wave rectifier,
   a pair of triggerable rectifier devices connected in series with the input terminals of said full wave rectifier across a source of alternating current, said devices being oriented oppositely to conduct on alternate cycles of the A.C. source,
   means for connecting a D.C. motor to the output of said full wave rectifier for operation thereby, when said devices are in their conducting states,
   a magnetic amplifier having a pair of main windings for controlling said devices, means including a pair of normally-closed switches connecting said windings in series with said input terminals to said full wave rectifier across said A.C. source, thereby to maintain said devices in their non-conducting states and to stop said motor, and means operative, when said switches are open, to apply triggering signals from said main windings to said devices, thereby to switch said devices to their conducting states, and to start said motor.

6. A control circuit as defined in claim 5 including a resistance in series with said main windings and in parallel with the input terminals to said full wave rectifier.

References Cited

UNITED STATES PATENTS

| | | | |
|---|---|---|---|
| 2,622,239 | 12/1952 | Bracutt | 318—347 |
| 3,237,075 | 2/1966 | Sommeria | 318—341 |

ORIS L. RADER, Primary Examiner

R. C. CASARI, Assistant Examiner

U.S. Cl. X.R.

318—512